(12) United States Patent
Baek et al.

(10) Patent No.: US 9,299,462 B2
(45) Date of Patent: Mar. 29, 2016

(54) NUCLEAR FUEL ROD FOR FAST REACTOR

(71) Applicant: KOREA ATOMIC ENERGY RESEARCH INSTITUTE, Daejeon (KR)

(72) Inventors: Jong-Hyuk Baek, Daejeon (KR); Chan-Bock Lee, Daejeon (KR); Jun-Hwan Kim, Daejeon (KR); Jin-Sik Cheon, Daejeon (KR); Byoung-Oon Lee, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 376 days.

(21) Appl. No.: 13/689,303

(22) Filed: Nov. 29, 2012

(65) Prior Publication Data

US 2013/0170603 A1    Jul. 4, 2013

(30) Foreign Application Priority Data

Dec. 23, 2011    (KR) .................. 10-2011-0141175

(51) Int. Cl.
  *G21C 3/17*    (2006.01)
  *G21C 3/16*    (2006.01)
  *G21C 3/20*    (2006.01)
  G21C 3/07     (2006.01)

(52) U.S. Cl.
  CPC .. *G21C 3/16* (2013.01); *G21C 3/17* (2013.01); *G21C 3/20* (2013.01); G21C 3/07 (2013.01); Y02E 30/40 (2013.01)

(58) Field of Classification Search
  CPC .................................... G21C 3/17; G21C 3/28

USPC .................. 376/418, 422, 428, 431, 453, 455
See application file for complete search history.

(56) References Cited

U.S. PATENT DOCUMENTS

| | | | | |
|---|---|---|---|---|
| 3,053,743 A | * | 9/1962 | Cain | 376/428 |
| 3,115,446 A | * | 12/1963 | Finniston | 376/455 |
| 3,202,583 A | * | 8/1965 | Salesse et al. | 376/455 |
| 3,222,773 A | * | 12/1965 | Zambrow | 228/131 |
| 3,244,599 A | * | 4/1966 | Hildebrand | 376/455 |
| 3,311,540 A | * | 3/1967 | Tower et al. | 376/420 |
| 3,406,090 A | * | 10/1968 | Dunn et al. | 376/455 |
| 3,619,366 A | * | 11/1971 | Chubb et al. | 376/455 |
| 3,808,099 A | * | 4/1974 | Ballagny | 376/455 |

(Continued)

FOREIGN PATENT DOCUMENTS

| | | |
|---|---|---|
| KR | 10-2009-0025399 A | 3/2009 |
| KR | 10-2011-0080965 A | 7/2011 |

*Primary Examiner* — Jack W Keith
*Assistant Examiner* — Daniel Wasil
(74) *Attorney, Agent, or Firm* — Bachman & LaPointe, P.C.

(57) ABSTRACT

A nuclear fuel rod for a fast reactor is provided, in which a reactor core of the fast reactor can be designed compact-sized by reducing the length of the nuclear fuel rod to be smaller than the length of a conventional one. The nuclear fuel rod for a fast reactor includes a tubular fuel materials comprising a hollow portion formed therein, a tubular inner pipe inserted into the hollow portion of the tubular fuel materials to prevent collapse of the tubular fuel materials due to combustion of nuclear fuel, a tubular cladding pipe which surrounds the tubular fuel materials, and a liquid metal, or He gas or vacuum applied in a gap between the tubular fuel materials and the tubular cladding pipe, and the tubular inner pipe includes a collecting space formed therein to collect fission products such as fission gas which are generated due to combustion of the nuclear fuel.

7 Claims, 7 Drawing Sheets

(56) References Cited

U.S. PATENT DOCUMENTS

| | | | |
|---|---|---|---|
| 2007/0258556 A1* | 11/2007 | Song et al. | 376/455 |
| 2009/0141851 A1* | 6/2009 | Lee et al. | 376/417 |
| 2012/0027152 A1* | 2/2012 | Reese et al. | 376/190 |

* cited by examiner

<PRIOR ART>

<PRIOR ART>

NUCLEAR FUEL ROD FOR FAST REACTOR

CROSS-REFERENCES TO RELATED APPLICATION

This application claims priority from Korean Patent Application No. 10-2011-0141175, filed on Dec. 23, 2011, in the Korean Intellectual Property Office, the contents of which are incorporated herein by reference in its entirety.

BACKGROUND OF THE INVENTION

1. Field of the Invention

The present invention relates to a nuclear fuel rod for a fast reactor, and more particularly, to a nuclear fuel rod for a fast reactor in which a reactor core of a sodium-cooled fast reactor (SFR) is designed compact-sized.

2. Description of the Related Art

The fast reactor is generally known for pyroprocessing in which nuclear waste from the light water reactor is recycled.

The fast reactor, and more specifically, the sodium-cooled fast reactor (SFR) continuously breeds more fuel for fission in the reactor than it consumes. Further, the nuclear waste from the light water reactors has relatively long half life and nucleus with high radiotoxicity is split into more stable nuclei with reduced radiotoxicity by the transmutation in SFR. With high utilization of the fuel, sustained energy supply can be provided while waste is reduced by SFR.

FIG. 5 illustrates a constitution of a conventional nuclear fuel rod for a fast reactor.

Referring to FIG. 5, the conventional nuclear fuel rod for the fast reactor includes a slender cylindrical fuel material 10, and a cladding tube 20 in a tubular form surrounding the material 10.

The fast reactor is designed to be cooled by liquid metal such as sodium (Na), lead (Pb), lead-bismuth (Pb—Bi) alloy instead of water which is used as a coolant in the light- or heavy-water reactor. It is also possible to cool the heat generated from the slug 10 by feeding liquid metal 30 also into the cladding tube 20.

Meanwhile, in the conventional nuclear fuel rod for the fast reactor, plenum, which is the space to collect fission products (specifically, fission gas), is placed above the materials, taking up approximately 42% of the entire length of the nuclear fuel rod.

The plenum is considered to be one of the important factors that influence inner pressure of the fuel rod due to release of fission products (specifically, fission gas) according to the consumption of the nuclear fuel. In determining the overall length of the nuclear fuel rod and determining height of the reactor core, it is necessary to reduce the overall length of the nuclear fuel rod by reducing the length of the plenum for the purpose of compacter reactor.

By way of example, Korean Patent Application No. 10-2007-0082795 (Korean Patent No. 1009156020000) (title: Fuel rod coated with oxide film on inner surface of the cladding and its manufacturing method) proposes a technology to extend the lifespan of the fast reactor by forming an oxide film on an inner surface of the cladding tube of the nuclear fuel rod for fast reactor, thereby suppressing fuel cladding chemical interaction (FCCI) between metallic fuel slug and cladding tube and increasing maximum allowable degree of burnup and maximum allowable temperature.

FIG. 6 illustrates another constitution of a conventional nuclear fuel rod for fast reactor.

Referring to FIG. 6, the nuclear fuel rod for fast reactor of Korean Patent No. 1009156020000 has a film of oxide selected from a group consisting of chromium oxide ($Cr_2O_3$), Vanadium oxide ($V_2O_3$) and zirconium oxide ($ZrO_2$) which is coated on an inner surface of the cladding tube, in which the oxide film suppresses chemical reaction between the metallic slug and the cladding tube to thus increase temperature at the outlet of the fast reactor. However, the above-mentioned patent inherently has a problem of difficulty of designing compact-sized reactor core, due to the metallic slug that is structurally identical to the conventional fuel slug.

Korean Patent Application No. 10-2008-0011094 (Korean Patent No. 10-0959152) (title: Metallic fuel element with nitride-coated layer on cladding inner surface for fast nuclear reactor and manufacturing method thereof) discloses a technology to lift up the operational temperature limit by efficiently suppressing inter-diffusion reaction between metallic fuel slug received in the cladding tube and the cladding tube by stably forming nitride-coated layer of the transition elements on inner wall of the cladding tube, thereby preventing generation of inter-reaction layer between the metallic fuel slug and the inner wall of the cladding tube.

FIG. 7 illustrates a constitution of yet another conventional nuclear fuel rod for fast reactor.

Referring to FIG. 7, the metallic nuclear fuel for use in fast reactor includes a metallic fuel slug 1 of cylindrical configuration, a hollow cylindrical cladding tube 3 surrounding the metallic fuel slug 1, a nitride-coated layer 2 of transition element formed on inner wall of the cladding tube 3, and liquid metal 4 filled between the metallic fuel slug 1 and the cladding tube 3. While the conventional constitution aims to lift up the operational temperature limit by preventing generation of the inter-reacting layer between the metallic fuel slug 1 and the inner wall of the cladding tube 3 due to the nitride-coated layer 2, this still does not address the problem associated with the difficulty of forming compact-sized reactor core since the metallic fuel slug 1 is formed structurally identical to the conventional fuel slug.

Korean Pat No. 10-0963472 mentions metallic fuel rod including in the cladding tube a metal sheath having therein metallic fuel particles formed by atomizing technique, and a preparation method thereof. However, Korean Pat No. 10-0963472 does not describe about ensuring plenum space by defining a hollow space in the center occupied by the fuel material. That is, the patent only inserts metal sheath into cladding tube to prevent interaction between the fuel material and the cladding tube.

Accordingly, in order to solve the problems occurring in the prior art, the inventors have researched for a method for designing a compact-sized reactor core by structurally altering a nuclear fuel rod for a fast reactor and thus completed the present invention.

SUMMARY OF THE INVENTION

An aspect of the present invention provides a nuclear fuel rod in which a reactor core of the fast reactor can be compact-sized by reducing the length of the nuclear fuel rod to be smaller than the length of the conventional one.

In order to achieve the aspect of the invention, the present invention provides a nuclear fuel rod for a fast reactor which may include tubular fuel (that is, fuel slug or fuel particles) having a hollow portion therein, a tubular inner pipe inserted into the hollow portion of the tubular fuel materials to prevent collapse of the tubular fuel rod due to combustion of the nuclear fuel, and a liquid metal, or He gas or vacuum applied in gaps between a tubular cladding pipe surrounding the tubular fuel materials and the tubular fuel materials and the tubular cladding pipe, in which the tubular inner pipe collects nuclear fission products such as fission gas therein which is generated due to combustion of the nuclear fuel.

Further, the nuclear fuel rod for the fast reactor according to an embodiment may additionally include a plenum provided on an upper end of the tubular fuel rod to collect nuclear fission products such as fission gas which is generated due to combustion of the nuclear fuel.

Further, the tubular fuel materials may include at least one element selected from a group consisting of uranium (U), plutonium (Pu), zirconium (Zr), americium (Am), neptunium (Np), and curium (Cm).

The cross-section fraction occupied by the tubular fuel materials may take up 50% to 90% of the total cross section of the fuel rod.

An outer circumference of the tubular inner pipe and an inner circumference of the tubular fuel materials may be brought into close contact with each other so that the tubular inner pipe supports the tubular fuel materials.

The tubular inner pipe may be formed from molybdenum (Mo), tungsten (W), niobium (Nb), tantalum (Ta), or alloy thereof.

The tubular cladding pipe may be formed from stainless steel.

The liquid metal may be sodium, but may be He gas or vacuum depending on embodiments.

According to the nuclear fuel rod for a fast reactor in one embodiment, reactor core of the fast reactor can be compact-sized by reducing the length of the nuclear fuel rod from the length of the conventional one.

Further, in one embodiment, operation margin can be increased by reducing the core temperature of the nuclear fuel rod.

Further, in one embodiment, safety is ensured in the event of design basis accident (DBA) where fuel materials melting occurs.

Meanwhile, in one embodiment, the tubular fuel materials may be formed by casting metal fuel material. To be specific, the tubular fuel materials may be formed into metal fuel particles by spraying, and vibro-packed into the tubular fuel materials.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Figure 1:
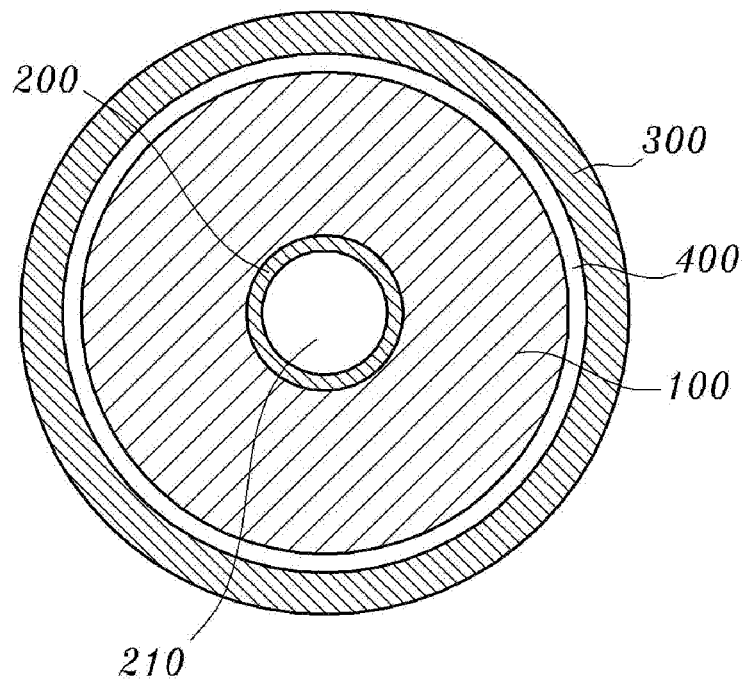
FIG. 1 illustrates a constitution of a nuclear fuel rod for a fast reactor according to an embodiment.

Reference will now be made in detail to the embodiments of the present invention, examples of which are illustrated in the accompanying drawings, wherein like reference numerals refer to the like elements throughout. The embodiments are described below to explain the present invention by referring to the figures.

The invention relates to a nuclear fuel rod for a fast reactor in which a reactor core of the fast reactor, or a reactor core of a sodium-cooled fast reactor (SFR) to be more specific, is designed compact-sized by reducing the length of the nuclear fuel rod to be smaller than the length of the conventional nuclear fuel rod.

FIG. 1 illustrates a constitution of a nuclear fuel rod for a fast reactor according to an embodiment.

Referring to FIG. 1, the nuclear fuel rod for a fast reactor according to an embodiment may include a tubular fuel materials 100, a tubular inner pipe 200, a tubular cladding pipe 300 and a liquid metal 400 (or He gas or vacuum depending on embodiments), which are assembled in the form of a nuclear fuel assembly at predetermined intervals from each other and mounted to the interior of the fast reactor.

Although not illustrated, the nuclear fuel rod for the fast reactor according to an embodiment may additionally include a plenum which is provided on an upper end of the tubular fuel materials 100 to collect fission gas which is generated due to combustion of the nuclear fuel.

Figure 2:
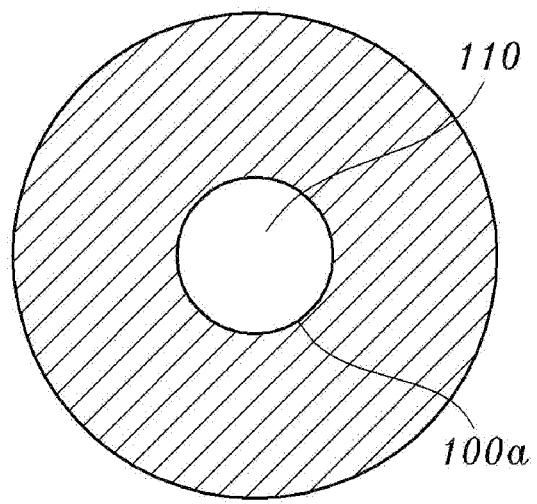
FIG. 2 illustrates a constitution of a tubular fuel material of a nuclear fuel rod for a fast reactor according to an embodiment.

FIG. 2 illustrates a constitution of the tubular fuel materials of the nuclear fuel rod for the fast reactor according to an embodiment.

Referring to FIG. 2, the tubular fuel materials 100 may include a hollow portion 110 formed therein.

Figure 5:
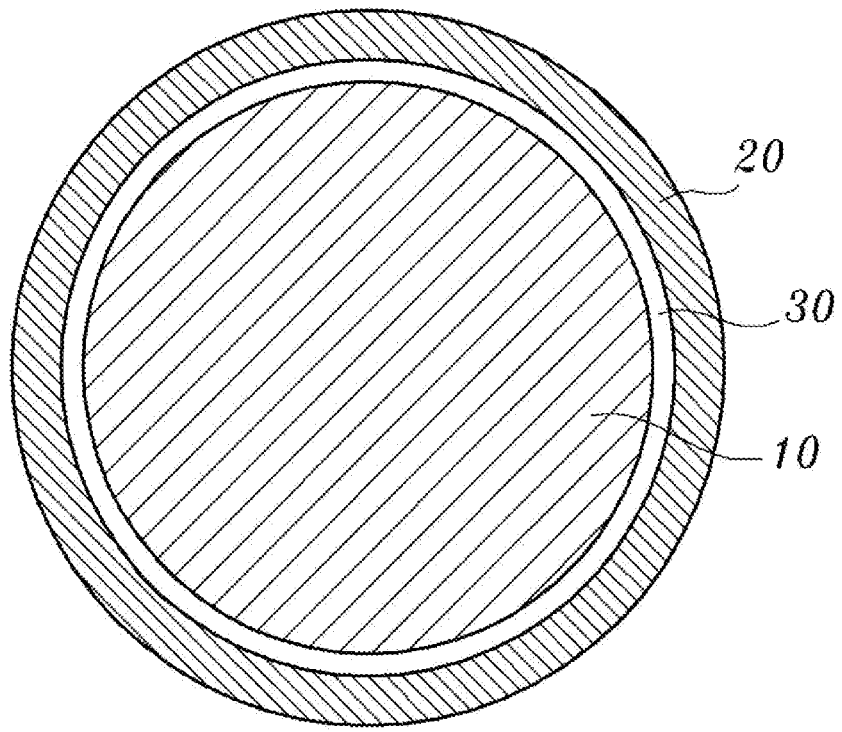
FIG. 5 illustrates a first constitution of a conventional nuclear fuel rod for a fast reactor.
Figure 6:
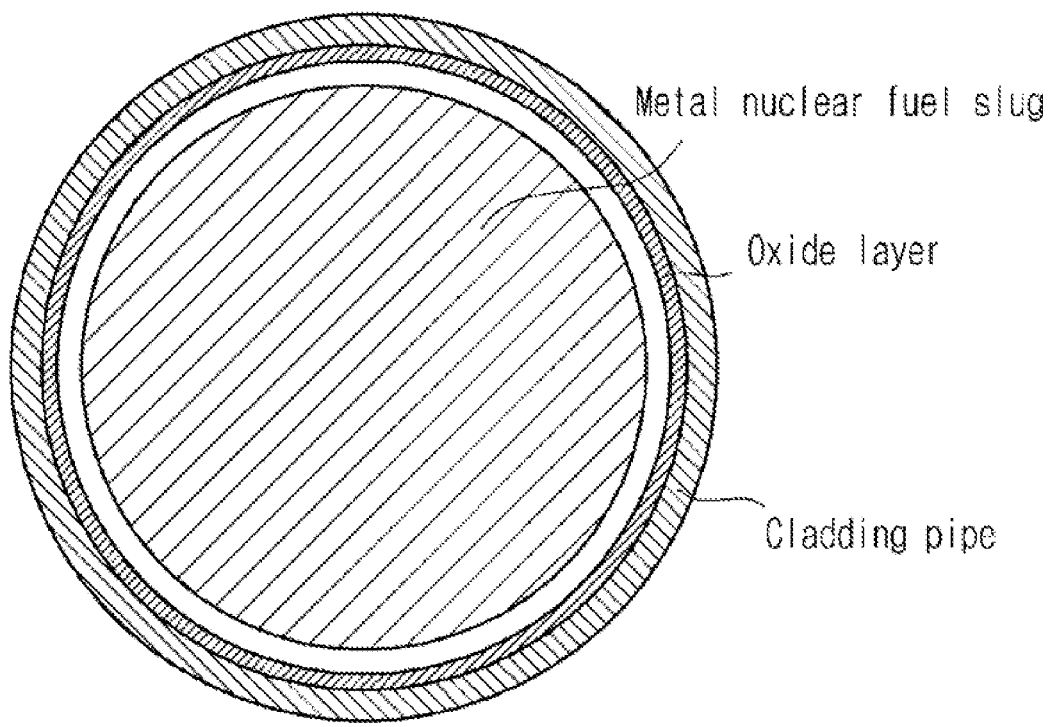
FIG. 6 illustrates a second constitution of a conventional nuclear fuel rod for a fast reactor.
Figure 7:
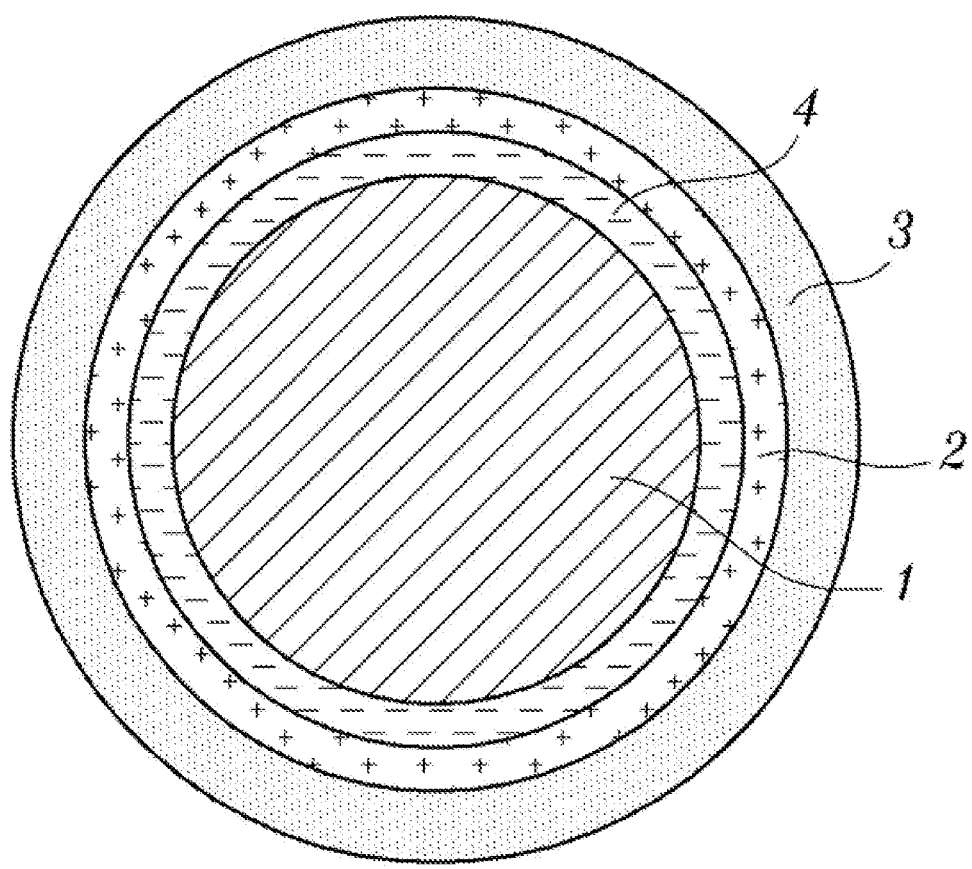
FIG. 7 illustrates a third constitution of a conventional nuclear fuel rod for a fast reactor.

Generally, as illustrated in FIG. 5, the fuel materials provided in the conventional nuclear fuel rod for the fast reactor have an elongated, slender cylindrical shape which does not have a hollow portion therein. However, in one embodiment, the fuel materials 100 may have the hollow portion 110 formed therein (FIG. 2).

To be specific, the hollow portion 110 is provided to collect the fission products such as fission gas released in accordance with the combustion of the nuclear fuel, and in one embodiment, due to the presence of the hollow portion 110 defined in the fuel materials 100, the length of the plenum, playing the same role as the hollow portion 110, may be reduced, and as a result, the overall length of the nuclear fuel rod may be reduced.

That is, instead of reducing the length of the plenum, which works as the space to collect the fission products such as fission gas, an embodiment additionally forms the hollow portion 110 in the fuel materials 100 to play the same role as the plenum, thereby reducing the length of the nuclear fuel rod and thus enable designing of a compact-sized reactor core of the fast reactor.

The tubular fuel materials 100 include fission fuel therein, and may be sealed off by a receptacle such as the tubular cladding pipe 300 which has good compatibility with the liquid metal 400 and no reactivity, and excellent heat conductivity. The space filled with liquid metal may alternatively be filled with He gas or vacuum as need arises.

To be specific, the tubular fuel materials 100 may include at least one element selected from a group consisting of uranium (U), plutonium (Pu), zirconium (Zr), americium (Am), neptunium (Np), and curium (Cm).

As explained above, in one embodiment, the output from the fast reactor may decrease from that of the conventional fuel materials due to the presence of the hollow portion 110 formed in the fuel materials 100 and subsequent decrease in the amount of fission products such as fission gas. However, this decrease in the output may be compensated by increasing the diameter of the fuel materials.

Meanwhile, the cross section fraction occupied by the fuel materials in the fuel rod may control the heat generated during the nuclear fission.

Accordingly, if the area is too small, heat output will deteriorate, while if the area is too large, mechanical interaction with the cladding pipe may increase due to expansion of the fuel materials following the nuclear fission release. In consideration of the above, the cross section fraction occupied by the tubular fuel materials 100 may take up 50% to 90%, and preferably, take up approximately 75% of the total cross section.

Referring to FIG. 1, the tubular inner pipe 200 may be inserted into the hollow portion 110 of the tubular fuel materials 100 to prevent collapse of the tubular fuel materials 100 due to combustion of the nuclear fuel.

To be specific, since an outer circumference 200a of the tubular inner pipe 200 and an inner circumference 100a of the tubular fuel materials 100 are brought into close contact with each other, the tubular inner pipe 200 support the tubular fuel materials 100 and therefore, collapse of the tubular fuel materials 100 due to combustion of the nuclear fuel can be prevented.

Figure 3:
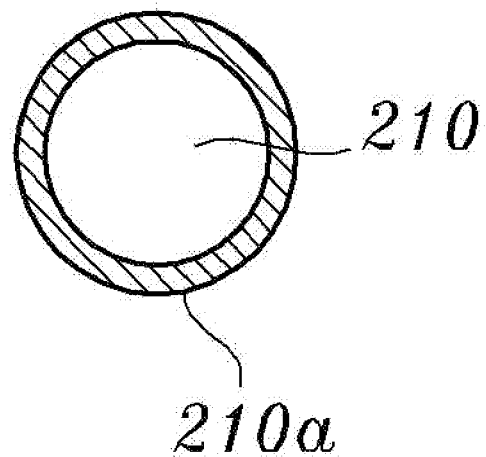
FIG. 3 illustrates a constitution of a tubular inner pipe of a nuclear fuel rod for a fast reactor according to an embodiment.

FIG. 3 illustrates a constitution of the tubular inner pipe of the nuclear fuel rod for a fast reactor according to an embodiment.

Referring to FIG. 3, the tubular inner pipe 200 may include a collecting space 210 therein to collect fission products such as fission gas generated due to the combustion of nuclear fuel.

To be specific, the collecting space 210 may be formed in the inner pipe 200 and like the plenum, may collect the fission gas which is generated due to the combustion of the nuclear fuel.

Further, the tubular inner pipe 200 may be formed from molybdenum (Mo), tungsten (W), niobium (Nb), tantalum (Ta), or alloy thereof.

Referring to FIG. 1, the tubular cladding pipe 300 may cover the tubular fuel materials 100 from outside.

Figure 4:
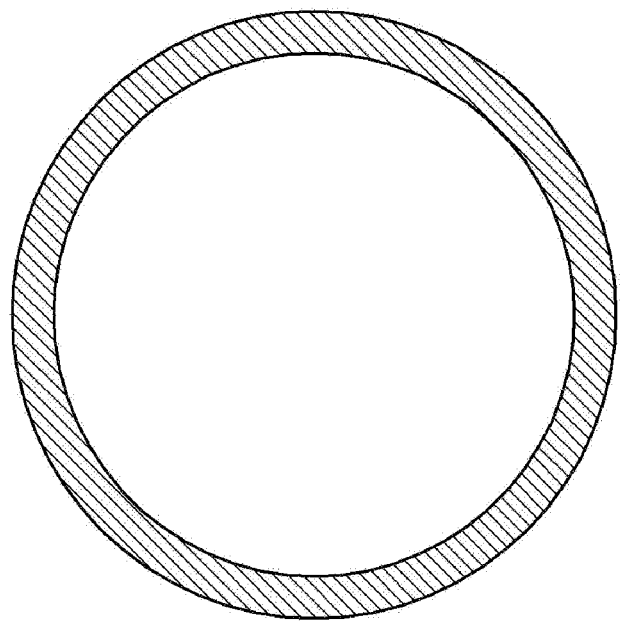
FIG. 4 illustrates a constitution of a tubular cladding pipe of a nuclear fuel rod for a fast reactor according to an embodiment.

FIG. 4 illustrates a constitution of the tubular fuel materials 100 of a nuclear fuel rod for a fast reactor according to an embodiment.

Referring to FIG. 4, the tubular cladding pipe 300 may be formed into a tubular configuration having a hole formed therein, and referring to FIG. 1, may cover the tubular fuel materials 100 from outside as the tubular fuel materials 100 is placed in the hole of the tubular cladding pipe 300.

Further, the tubular cladding pipe 300 may be formed from stainless steel to prevent leakage of the products of the nuclear fission, while also preventing chemical interaction between the nuclear fission materials and the coolant placed outside the nuclear fuel rod by blocking direct contact thereof.

To be specific, the tubular cladding pipe 300 may be formed from high chrome stainless steel containing 8 to 12 wt % chrome, and may consist of element such as iron, chrome, tungsten, molybdenum, vanadium, or niobium.

Referring to FIG. 1, the liquid metal (or He gas or vacuum depending on embodiments) 400 may be filled in gap between the tubular fuel materials 100 and the tubular cladding pipe 300, and may be sodium.

To be specific, gaps may be formed between the tubular fuel materials 100 and the tubular cladding pipe 300 to accommodate the thermal expansion of the tubular fuel materials 100 during combustion, and by charging liquid sodium with good thermal conductivity in this gap between the tubular fuel materials 100 and the tubular cladding pipe 300, the thermal conductivity may be enhanced between the tubular fuel materials 100 and the tubular cladding pipe 300.

That is, by releasing the heat generated due to nuclear reaction of the tubular fuel materials 100 during combustion of the nuclear fuel using the liquid metal (or He gas or vacuum depending on embodiments) 400 to outside the tubular cladding pipe 300, the core temperature of the tubular fuel materials 100 can be decreased.

As explained above, in the nuclear fuel rod for the fast reactor according to an embodiment, since the length of the nuclear fuel rod can be reduced from the length of the conventional one, the reactor core of the fast reactor can be designed to be compact-sized, and since the core temperature of the nuclear fuel rod is decreased, the operation margin can be increased, and safety is ensured in the event of the design basis accident (DBA) due to fuel materials melting.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A nuclear fuel rod for a fast reactor, comprising:
   tubular fuel materials comprising a hollow portion formed therein;
   a tubular inner pipe inserted into the hollow portion of the tubular fuel materials to prevent collapse of the tubular fuel materials due to combustion of nuclear fuel;
   a tubular cladding pipe which surrounds the tubular fuel materials; and
   a liquid metal charged in a gap between the tubular fuel materials and the tubular cladding pipe, wherein
   the tubular inner pipe comprises a collecting space formed therein to collect fission products which are generated due to combustion of the nuclear fuel,
   wherein the tubular cladding pipe is formed from stainless steel,
   wherein the tubular inner pipe is formed from molybdenum (Mo), tungsten (W), niobium (Nb), or tantalum (Ta).

2. The nuclear fuel rod of claim 1, wherein the tubular fuel materials comprises at least one element selected from a group consisting of uranium (U), plutonium (Pu), zirconium (Zr), americium (Am), neptunium (Np), and curium (Cm).

3. The nuclear fuel rod of claim 1, wherein a cross section fraction occupied by the tubular fuel materials takes up 50% to 90% of the total cross section of the fuel rod.

4. The nuclear fuel rod of claim 1, wherein an outer circumference of the tubular inner pipe and an inner circumference of the tubular fuel materials contact each other, so that the tubular inner pipe supports the tubular fuel materials.

5. The nuclear fuel rod of claim 1, wherein the liquid metal is sodium.

6. The nuclear fuel rod of claim 1, wherein the tubular fuel materials are formed by casting metal fuel materials.

7. The nuclear fuel rod of claim 1, wherein the tubular fuel materials are formed by Vibro-packing metal fuel particles.

* * * * *